US010362119B2

(12) United States Patent
Morales

(10) Patent No.: US 10,362,119 B2
(45) Date of Patent: Jul. 23, 2019

(54) SYSTEM AND METHOD FOR INTERNET OF THINGS AND HOME AUTOMATION USING A VEHICLE

(71) Applicant: VOXX INTERNATIONAL CORPORATION, Hauppauge, NY (US)

(72) Inventor: Mike Morales, Orlando, FL (US)

(73) Assignee: VOXX INTERNATIONAL CORP., Hauppauge, NY (US)

( * ) Notice: Subject to any disclaimer, the term of this patent is extended or adjusted under 35 U.S.C. 154(b) by 0 days.

(21) Appl. No.: 15/858,134

(22) Filed: Dec. 29, 2017

(65) Prior Publication Data

US 2018/0191829 A1 Jul. 5, 2018

Related U.S. Application Data

(60) Provisional application No. 62/439,991, filed on Dec. 29, 2016.

(51) Int. Cl.

| | |
|---|---|
| ***H04W 4/02*** | (2018.01) |
| ***H04W 4/38*** | (2018.01) |
| ***H04W 4/44*** | (2018.01) |
| ***H04W 4/70*** | (2018.01) |
| ***H04W 4/80*** | (2018.01) |
| ***H04L 12/28*** | (2006.01) |
| ***H04L 29/08*** | (2006.01) |

(52) U.S. Cl.

CPC ........ *H04L 67/125* (2013.01); *H04L 12/2803* (2013.01); *H04W 4/025* (2013.01); *H04W 4/44* (2018.02); *H04W 4/70* (2018.02); *H04L 2012/2841* (2013.01); *H04W 4/38* (2018.02); *H04W 4/80* (2018.02)

(58) Field of Classification Search

CPC .............................. H04L 12/2818; B60Q 1/00

USPC ...................................................... 340/686.1

See application file for complete search history.

(56) References Cited

U.S. PATENT DOCUMENTS

| | | | | |
|---|---|---|---|---|
| 2010/0156608 A1* | 6/2010 | Bae | H04Q 9/00 | 340/10.5 |
| 2014/0244825 A1* | 8/2014 | Cao | H04L 12/2818 | 709/223 |
| 2014/0306833 A1* | 10/2014 | Ricci | B60Q 1/00 | 340/901 |
| 2015/0006695 A1* | 1/2015 | Gupta | H04L 41/32 | 709/223 |
| 2016/0105292 A1* | 4/2016 | Choi | H04L 51/02 | 709/206 |

(Continued)

*Primary Examiner* — Fabricio R Murillo Garcia

(74) *Attorney, Agent, or Firm* — F. Chau & Associates, LLC

(57) ABSTRACT

A system for home and automobile connectivity, including: a smart home, the smart home including a plurality of internet-of-things (IoT) devices, the IoT devices communicably coupled to a home network; an automobile module, the automobile module connected to a plurality of sensors and a plurality of wired communication paths in a vehicle, the automobile module configured to output sensor data via a plurality of wireless communication paths; and an automobile bridge, the automobile bridge including a plurality of different communication protocols for communicating with different ecosystems in the home network, and a plurality of wireless communication paths for communication with the home network and the automobile module.

20 Claims, 4 Drawing Sheets

110

Smart Home

120

Auto Bridge

130

Auto Module

(56) References Cited

U.S. PATENT DOCUMENTS

2016/0353305 A1 * 12/2016 Zakaria ............ H04M 1/72519

* cited by examiner

When the cloud Receive "Action 1" Run Routine 1

When the cloud Receive "Action 2" Run Routine 2

Smart Home Cloud

| SmartThing Device | Routine 1 | Routine2 |
| --- | --- | --- |
| SONOS | Play "Action 1 is ON" | Play "Action 2 is ON" |
| Black Lamp | OFF | ON |
| Teal Lamp | ON | OFF |
| Fan | ON | ON |

FIG. 3

| SmartThing Device | Routine 1 | Routine 2 | Routine 3 | Routine 4 | Reset |
|---|---|---|---|---|---|
| SONOS | Play "Action 1 is ON" | Play "Action 2 is ON" | Play "Action 3 is ON" | Play "The temperature in your car is 50 degrees" | - |
| Black Lamp | OFF | ON | ON | - | OFF |
| Teal Lamp | ON | OFF | ON | - | OFF |
| Fan | ON | ON | ON | - | OFF |

SYSTEM AND METHOD FOR INTERNET OF THINGS AND HOME AUTOMATION USING A VEHICLE

CROSS-REFERENCE TO RELATED APPLICATION

This application claims priority under 35 U.S.C. § 119/120 to U.S. provisional application No. 62/439,991, filed on Dec. 29, 2016 in the U.S. Patent and Trademark Office, the disclosure of which is incorporated by reference herein in its entirety.

TECHNICAL FIELD

The present invention relates to home automation systems, and more particularly to, home automation systems involving an automobile.

SUMMARY

According to an exemplary embodiment of the present invention, there is provided a system for home and automobile connectivity, comprising: a smart home, the smart home including a plurality of internet-of-things (IoT) devices, the IoT devices communicably coupled to a home network; an automobile module, the automobile module connected to a plurality of sensors and a plurality of wired communication paths in a vehicle, the automobile module configured to output sensor data via a plurality of wireless communication paths; and an automobile bridge, the automotive bridge including a plurality of different communication protocols for communicating with different ecosystems in the home network, and a plurality of wireless communication paths for communication with the home network and the automobile module.

According to an exemplary embodiment of the present invention, the sensors include a temperature sensor, a humidity sensor, or a motion sensor.

According to an exemplary embodiment of the present invention, the wired communication paths include a controller area network (CAN) bus or a local area interconnect (LIN) bus.

According to an exemplary embodiment of the present invention, the automobile module is integrated into a vehicle subsystem.

According to an exemplary embodiment of the present invention, the subsystem includes a remote keyless entry system, a remote start system or an infotainment system.

According to an exemplary embodiment of the present invention, the automobile module is a standalone device.

According to an exemplary embodiment of the present invention, the wireless communication paths in the automobile bridge and the automobile module include WiFi, Bluetooth, or Zigbee.

According to an exemplary embodiment of the present invention, the automobile bridge is disposed inside the home, a garage or a carport.

According to an exemplary embodiment of the present invention, the automobile bridge is configured to provide the sensor data (e.g., identify motion near a vehicle) to the home network and, in response to the sensor data, the home network is configured to trigger an event (e.g., turn on lights near vehicle) in the home.

According to an exemplary embodiment of the present invention, the automobile bridge is configured to provide an instruction (e.g., disengage ignition) to the vehicle module based on an action (e.g., unauthorized motion sensed) inside the home.

According to an exemplary embodiment of the present invention, there is provided a system for home and automobile connectivity, comprising: an automobile module, the automobile module configured to be connected to a plurality of sensors and a plurality of wired communication paths in a vehicle, the automobile module configured to output sensor data via a plurality of transceivers; and an automobile bridge, the automobile bridge including a plurality of different communication protocols for communicating with different ecosystems in a home network, and a plurality of transceivers for communication with a home network and the automobile module.

According to an exemplary embodiment of the present invention, the sensors include a temperature sensor, a humidity sensor, or a motion sensor.

According to an exemplary embodiment of the present invention, the wired communication paths include a CAN bus or a LIN bus.

According to an exemplary embodiment of the present invention, the automobile module is integrated into a vehicle subsystem.

According to an exemplary embodiment of the present invention, the subsystem includes a remote keyless entry system, a remote start system or an infotainment system.

According to an exemplary embodiment of the present invention, the automobile module is a standalone device.

According to an exemplary embodiment of the present invention, the transceivers in the automobile bridge and the automobile module are WiFi, Bluetooth, or Zigbee transceivers.

According to an exemplary embodiment of the present invention, the automobile bridge is configured to provide the sensor data to the home network and, in response to the sensor data, the home network is configured to trigger an event in the home.

According to an exemplary embodiment of the present invention, the automobile bridge is configured to provide an instruction to the vehicle module based on an action inside the home.

According to an exemplary embodiment of the present invention, there is provided a system for home and automobile connectivity, comprising: a module, the module configured to be connected to a plurality of sensors and a plurality of wired communication paths in a vehicle, the module configured to output sensor data via a plurality of wireless communication paths; and an interpreter, the interpreter including a plurality of different communication protocols for communicating with different ecosystems in a home network, and a plurality of transceivers for communication with the home network and the module.

BRIEF DESCRIPTION OF THE DRAWINGS

FIGS. 3 and 4 show routines performed by in-home devices when a vehicle arrives at/departs from home according to exemplary embodiments of the present invention.

DETAILED DESCRIPTION OF EXEMPLARY EMBODIMENTS

Figure 1:
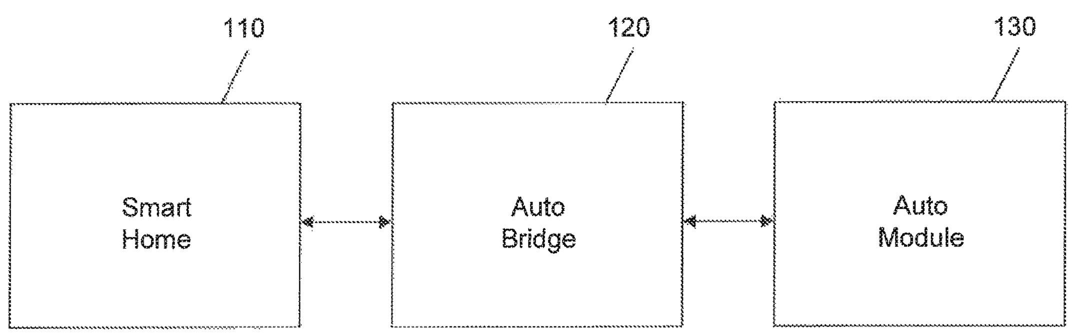
FIG. 1 illustrates a system according to an exemplary embodiment of the present invention.

In accordance with an exemplary embodiment of the present invention, there is provided a system and method for internet of things (IoT) and home automation using a vehicle. In IoT/Home automation according to an exemplary embodiment of the present invention, the automobile may be considered a "thing" of the home and not just an actor on the home. For example, the automobile becomes a client of the home network.

The smart home network originally was a Wi-Fi based communication network, to which all devices in the home would connect, and which would allow for an external or cloud connection as needed.

Later, in-home devices were developed that did not need access to an interact connection to function. This, plus bandwidth and device limitations, led to the creation of new communication protocols and devices such as hubs for the home network so that devices could communicate through a single, streamlined point or hub, and then, communicate to the Wi-Fi based home network as needed.

The things that can be done with the smart home are almost limitless, based on the sensors, devices, actions, and applications, which can be automated by times, events, routines, etc. The matrix below expresses this range.

| Communication Protocols | Example Sensors (In-vehicle and/or in-home) | Example Actions | Example Auto Applications | Example Home Applications (In & Outdoors) |
|---|---|---|---|---|
| Zigbee | Temperature | Open | Engine | Lights |
| Bluetooth | Humidity | Close | Remote start | Sprinklers |
| Z-Wave | Proximity | Turn On | RSE | HVAC |
| Insteon | Light | Turn Off | Door lock | Home Appliances |
| Wi-Fi | Open/Close State | Start | Mirrors | Locks & Openers |
| Thread | On/Off State | Stop | Lights | Camera |
| Apple Homekit | Full/Empty State | Release | Camera | Fan |
| UPB | In Motion State | Engage | Speaker | Speaker |
| Insteon | Pressure | Dispense | Video | Video |
| Etc. | Sound | Download | Memory | Memory |
| Etc. | Etc. | Etc. | Etc. | Etc. |

In accordance with an exemplary embodiment of the present invention, the vehicle can become an actor, or be acted upon, in the smart home. An automobile is already delivered as a Wi-Fi enabled product by many automakers. In an exemplary embodiment of the present invention, the automobile will also contain devices that can communicate with other devices in the vehicle, and also devices in the home. The method of communication may be direct from the automobile's built-in sensors to the smart home, or through a module that aids the communication. The module, according to an exemplary embodiment of the present invention, can be a stand-alone product, or integrated into existing systems such as a rear seat entertainment system.

The auto module may communicate via the vehicle's own Wi-Fi network to the cloud (e.g., internet), via a mobile device connection to the cloud, or upon arriving at the smart home. The auto module may also communicate via an auto bridge according to an exemplary embodiment of the present invention that will ease the connectivity between the in-vehicle devices and the in-home devices, allowing for creation of complex yet efficient routines for the convenience of the auto owner. The module and bridge may communicate using any one of the many communication protocols currently available on the market, such that that the bridge may serve as an interpreter.

The auto bridge may be placed in the smart-home, a garage or a carport, for example.

The auto bridge/auto module according to an exemplary embodiment of the present invention will allow for multiple forms of connectivity to occur through one route and allow for the creation of routines. The sensors of the vehicle will be able to action on the home, or the sensors of the home will be able to action on the vehicle.

Figure 2:
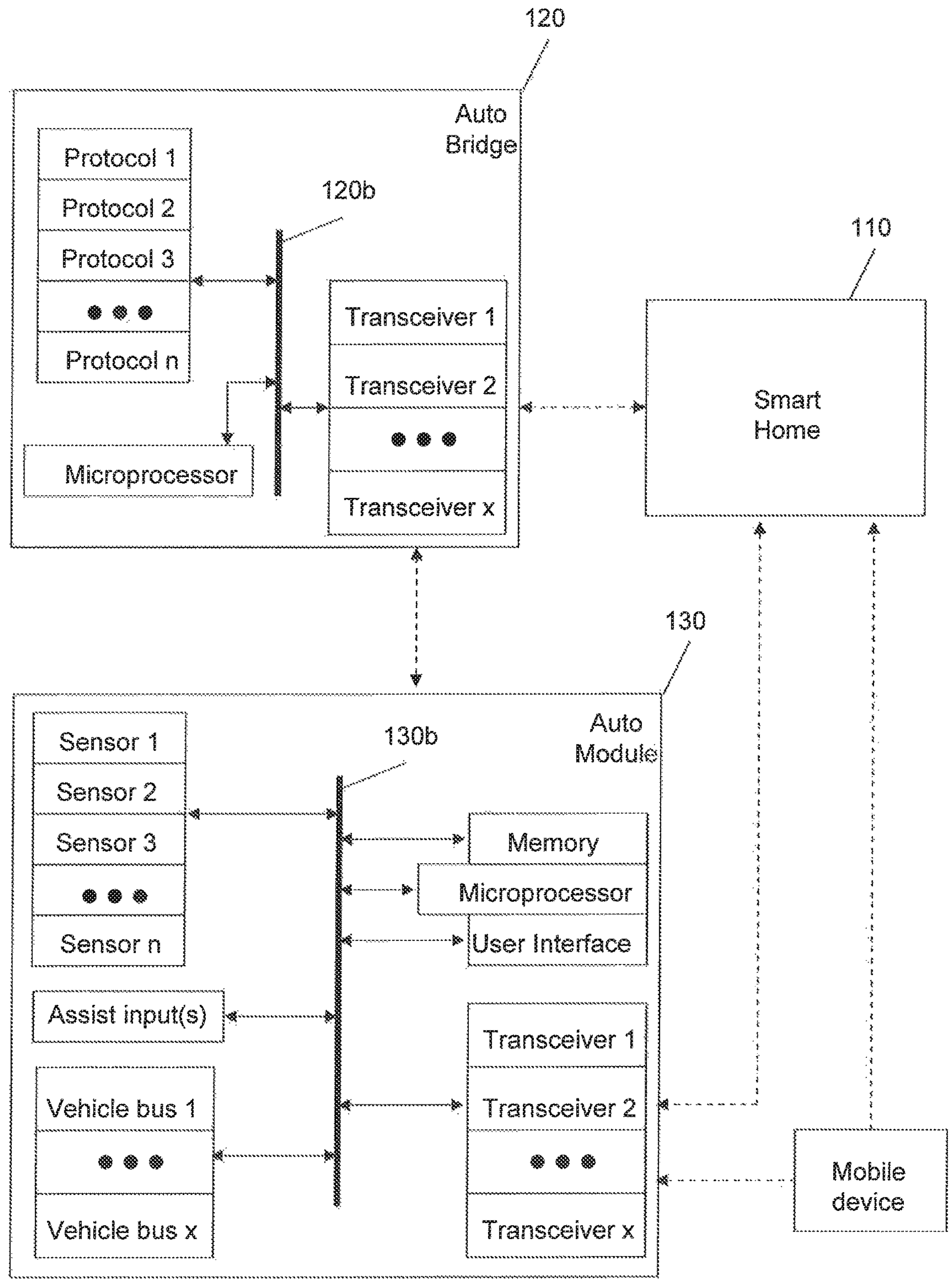
FIG. 2 illustrates the system of FIG. 1 in more detail.

FIG. 1 illustrates a system according to an exemplary embodiment of the present invention. FIG. 2 illustrates the system of FIG. 1 in more detail.

FIG. 1 shows a smart home 110, an auto bridge 120 and an auto module 130. Although FIG. 1 shows the auto module 130 communicating with the smart home 110 via the auto bridge 120, in some embodiments of the present invention, the auto bridge 120 may be bypassed when the auto module 130 and smart home 110 communicate with each other.

The smart home 110 may be, for example, an automated home. Such home automation involves the control and automation of lighting, heating (such as smart thermostats), ventilation, air conditioning (HVAC), and security, as well as home appliances such as washer/dryers, ovens or refrigerators/freezers. Wi-Fi is often used for remote monitoring and control. Home devices, when remotely monitored and controlled via the Internet, are an important constituent of the internet or things. Modern systems generally consist of switches and sensors connected to a central hub sometimes called a "gateway" from which the system is controlled with a user interface that is interacted either with a wall-mounted terminal, mobile phone software, tablet computer or a web interface, and often but not always via Internet cloud services.

As an example, the smart home 110 includes a plurality of internet of things devices such as lights, appliances (e.g., a Wi-Fi enabled toaster), etc. that may communicate with a hub and/or a Wi-Fi router. The hub may be a home network hub used to connect electronic elements of the home's network (e.g., a LAN) to each other. The Wi-Fi router may communicate with the internet or cloud. The hub, Wi-Fi router and internet of things devices may communicate via a number of wired or wireless protocols including Zigbee, Bluetooth, etc.

The auto bridge 120 may include a plurality of protocols Protocol 1 to Protocol n, a microprocessor and a plurality of transceivers Transceiver 1 to Transceiver n. The components of the bridge 120 may communicate via a bus **120*b*. The protocols Protocol 1 to Protocol n may be stored in a memory of the bridge 120. The protocols Protocol 1 to Protocol n may be different and permit communication with smart home assistants such as Apple Homekit, Echo/Alexa, Google Assistant, etc. The transceivers Transceiver 1 to Transceiver n may include long-range and short-range wireless transmission capabilities. For example, the transceivers Transceiver 1 to Transceiver n may include Zigbee, Z-wave, Bluetooth, etc. transceivers for communicating with the smart home 110 and the auto module 130. The bridge 120 may be like the hub and may consider destination of a data packet before transmitting it. For example, the bridge 120 may use the Bluetooth transceiver to transmit data to a vehicle if the vehicle is in close proximity to the bridge 120. Further, the bridge 120** may translate a message from the vehicle to the Echo/Alexa protocol if the destination of the message is the Echo/Alexa device within the home. The microprocessor may execute instructions effectuating these processes.

The auto module 130 may include a plurality of sensors Sensor 1 to Sensor n, a plurality of connections to vehicle bus(es) Vehicle bus 1 to Vehicle bus x, a plurality of transceivers Transceiver 1 to Transceiver x, a microprocessor, a memory and a user interface connected via a data bus 130*b*, for example. The auto module 130 may also include an input port/terminal for connecting with an assistant.

The sensors Sensor 1 to Sensor n may include a temperature sensor, a humidity sensor, a motion sensor, etc. The sensors Sensor 1 to Sensor n may measure environmental data, for example. The data, values, information acquired by the sensors Sensor 1 to Sensor n may be output from the auto module 130. This metadata, for example, may be information that can be acted upon.

The vehicle bus Vehicle bus 1 to Vehicle bus x connections connect the auto module 130 to the in-vehicle network, e.g., communication paths within the vehicle. The vehicle bus Vehicle bus 1 to Vehicle bus x connections may include terminals/ports for connecting to a variety of vehicle bus types, including but not limited to a controller area network (CAN) bus, a local area interconnect (LIN) bus, etc. Vehicle specific information may be gathered from the vehicle network via the CAN or LIN buses, for example.

The auto module 130 may be integrated into vehicle subsystems. In other words, it does not have to be a stand-alone device. For example, the auto module 130 may be integrated into RSE, remote start, infotainment, seats, etc.

The auto module 130 may also include a Wi-Fi module for direct connection to the Cloud. In this case, the Wi-Fi module may be one of the transceivers Transceiver 1 to Transceiver x. In this case, the auto module 130 can communicate with the smart home 110 via the Cloud. The auto module 130 may also communicate with a mobile device via this Wi-Fi connection. The mobile device may then connect to the Cloud.

The assist input may be used to connect the auto module 130 to a home assistant such as Apple Homekit, Echo/Alexa, Google Assistant, etc. The assistant may act upon the car, or may be connected with an external service via the Cloud.

The auto module 130 may also include a plurality of data output/input paths. These data output/input paths may utilize the transceivers Transceiver 1 to Transceiver x. The transceivers Transceiver 1 to Transceiver x may include Zigbee, Z-wave, Bluetooth, etc. transceivers for communicating with the auto bridge 120 and, in some cases, the smart home 110.

The auto module 130, bride 120, hub and appliances (of the smart home 110) may communicate with each other via a variety of electronic communication protocols listed in the above matrix, for example. The auto module 130 further includes a computing device electrically connected to its vehicle control and communication system to relay messages, data, etc. to the home's hub. The computing device may include a microprocessor, memory. The microprocessor may execute instructions to perform a variety of the aforementioned functions.

The computing device may further include a user interface permitting someone in the vehicle to set up routines to be performed when the vehicle arrives at/departs from home. For example, a vehicle operator may configure the home automation system to activate certain lights and the home's heating system directly from the user interface. These instructions may be stored in the computing device's memory and/or relayed to the hub.

Hereinafter is described a use case scenario according to an exemplary embodiment of the present invention, e.g., Departure from Home.

For example, in a cold-weather environment, it is common for vehicles owners to start their vehicle remotely so that the vehicle can be heated prior to entry by the driver and passengers. The customer uses his remote-start device to start his vehicle approximately five minutes before planned departure from his home. The remote start device communicates directly with the vehicle to start the engine via an existing protocol. The vehicle starts its engine per this command and heats the cabin of the vehicle. This is a very common existing use of an already-established item.

However, in the exemplary use case:

1. The vehicle also follows with communication with other devices in the home to initiate other actions based on a routine that has been programmed into the vehicle and other related devices:
   a. Utilizing one of a variety of communication protocols, the auto module 130 communicates with a "smart hub" in the home to indicate that the car has been started. Because the vehicle has started the engine, the "smart hub" sends a command to:
   i. the sensor built into the garage door to recognize the door open/closed condition. The sensor communicates back that the garage door is closed. The hub sends a signal to the electric garage door opener to open the door to allow ventilation of the vehicle exhaust fumes.
   ii. the auto module 130 instructs the vehicle's entertainment system to communicate with the hub to download:
      1. the latest podcasts & audio programming radio per the user's preferences.
      2. the latest video & television programming per the user's preferences.
      3. email and text from designated accounts to the vehicle entertainment system for narration of text to the driver when the vehicle is in operation.
   iii. the auto module 130, which is connected to the vehicle tire pressure monitoring system and engine on-board diagnostics, to obtain information from one of those systems such as a report on the engine's operating condition and/or whether any of the tires are below the recommended pressure level. This information is then passed on to the hub. The hub states any abnormal condition on the in-home smart speaker.
   iv. the sensor built into the outdoor wall next to the front door that senses temperature and humidity. The sensor recognizes that the conditions are suitable for ice and communicates this back to the hub. The hub turns on the heaters that are built into the path that leads from the front door to the external garage entrance so that any ice on the path will begin to melt, preventing a possible slip hazard for the driver of the vehicle while walking to the external garage.
   v. the outdoor video camera to display an image of the weather and temperature conditions outside the house on the video screen in the kitchen.
   vi. the in-home smart speaker to state the outdoor weather conditions and whether icy conditions that have been sensed outdoors may lead to ice on the sidewalk or driveway.
   vii. the vehicle entertainment system to state the road conditions when the driver has entered the vehicle, reminding the driver to drive cautiously.
2. After completely exiting the garage and passing a proximity sensor located in the driveway, the auto module 130 sends a command to the hub in home to:

i. Close the garage door.

ii. Turn off unneeded lights in the home.

iii. Change the thermostat setting on home HVAC to energy-saving mode.

iv. Activate the home security system, locking all doors and arming the alarm sensors.

v. Activate any home appliances desired to run in absence of this vehicle and driver, such as a dishwasher.

Hereinafter is described a use case scenario according to an exemplary embodiment of the present invention, e.g., Return to Home.

The vehicle recognizes which member of the family is driving per the vehicle key fob.

3. The auto module 130 communicates with the sensor in the driveway that the vehicle is arriving and who is driving the vehicle. The sensor communicates this to the hub.

a. The hub communicates with the appropriate garage door opener to open the correct garage door for that driver.

b. The hub communicates with the outdoor sensor to check the condition of the path to the house. The hub turns on the pathway heater to remove any ice, if appropriate.

c. The hub communicates with light sensors inside and outside the home and turns on preferred lights.

d. The hub disables the alarm and unlocks the appropriate door of the home per the driver/garage door.

e. The hub communicates with the letter box/package drop and communicates back to the auto module 130 whether there are any letters or packages delivered while absent. The auto module 130 communicates this through the in-car entertainment system so the driver can access the package drop prior to entering the home.

f. The hub changes the thermostat setting on home HVAC.

g. The auto module 130, which is connected to the vehicle entertainment system, communicates with the hub to download and synch entertainment preferences between the vehicle and the home.

Figure 4:
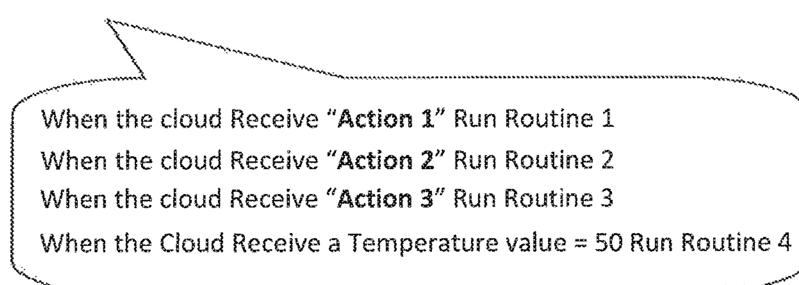

FIGS. 3 and 4 show routines performed by in-home devices when a vehicle arrives home (or is departing from home) according to exemplary embodiments of the present invention.

For example, when the vehicle is detected to be present or nearing the home, the hub may initiate one of the illustrated routines 1-4 in FIGS. 3 and 4. For example, certain lamps (interior/exterior may be turned on/off). Similarly, when the vehicle is being prepared for departure or actively leaving the home, a relevant routine may be executed. For example, the vehicle owner may be provided with the temperature inside the vehicle to thereby determine whether to instruct home network to open the garage door and remote start the vehicle. As another example, when user 1 arrives home, routine 1 in FIGS. 3 and 4 may be executed by the home automation system in response to an arrival indication signal from the vehicle computing device. Similarly, when user 2 arrives home, routine 2 in FIGS. 3 and 4 may be executed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention.

What is claimed is:

1. A system for home and automobile connectivity, comprising:

a smart home, the smart home including a plurality of Internet-of-things (IoT) devices, the IoT devices communicably coupled to a home network;

an automobile module, the automobile module connected to a plurality of sensors and a plurality of wired communication paths in a vehicle, the automobile module configured to output sensor data via a plurality of wireless communication paths; and an automobile bridge, the automobile bridge including a plurality of different communication protocols for communicating with different ecosystems in the home network, and a plurality of wireless communication paths for communication with the home network and the automobile module, wherein the different communication protocols permit communication with a plurality of different smart home assistants, and wherein the automobile bridge is further configured to translate a message sent from the vehicle to a communication protocol of the smart home assistant to which it is destined, wherein in response to an action at the vehicle, a pre-programmed routine stored in the automobile module is executed such that a command is sent from the automobile module to the home network via the automobile bridge thereby causing the home network to activate a pre-determined sequence of events in the smart home, wherein the automobile module includes a plurality of transceivers for communicating with the automobile bridge and the home network, a user interface for permitting a user to set up routines to be performed when the vehicle arrives at/departs from the smart home, and an assist input to connect the automobile module to at least one of the smart home assistants.

2. The system of claim 1, wherein the sensors include a temperature sensor, a humidity sensor, or a motion sensor.

3. The system of claim 1, wherein the wired communication paths include a controller area network (CAN) bus or a local area interconnect (LIN) bus.

4. The system of claim 1, wherein the automobile module is integrated into a vehicle subsystem.

5. The system of claim 4, wherein the subsystem includes a remote keyless entry system, a remote start system or an infotainment system.

6. The system of claim 1, wherein the automobile module is a standalone device.

7. The system of claim 1, wherein the wireless communication paths in the automobile bridge and the automobile module include WiFi, Bluetooth, or Zigbee.

8. The system of claim 1, wherein the automobile bridge is disposed inside the home, a garage or a carport.

9. The system of claim 1, wherein the automobile bridge is configured to provide the sensor data to the home network and, in response to the sensor data, the home network is configured to trigger an event in the home.

10. The system of claim 1, wherein the automobile bridge is configured to provide an instruction to the vehicle module based on an action inside the home.

11. A system for home and automobile connectivity, comprising:

an automobile module, the automobile module configured to be connected to a plurality of sensors and a plurality of wired communication paths in a vehicle, the automobile module configured to output sensor data via a plurality of first transceivers; and an automobile bridge, the automobile bridge including a plurality of different communication protocols for communicating with different ecosystems in a home network, and a plurality of second transceivers for communication with a home network and the automobile module, wherein the different communication protocols permit communication with a plurality of different smart home assistants, and wherein the automobile bridge is further configured to translate a message sent from the vehicle to a communication protocol of the smart home assistant to which it is destined, wherein in response to an action at the vehicle, a pre-programmed routine stored in the automobile module is executed such that a command is sent from the automobile module to the home network via the automobile bridge thereby causing the home network to activate a pre-determined sequence of events in the home, wherein the plurality of first transceivers of the automobile module are for communicating with the automobile bridge and the home network, and wherein the automobile module further includes a user interface for permitting a user to setup routines to be performed when the vehicle arrives at/departs from the home, and an assist input to connect the automobile module to at least one of the smart home assistants.

12. The system of claim 11, wherein the sensors include a temperature sensor, a humidity sensor, or a motion sensor.

13. The system of claim 11, wherein the wired communication paths include a controller area network (CAN) bus or a local area interconnect (LIN) bus.

14. The system of claim 11, wherein the automobile module is integrated into a vehicle subsystem.

15. The system of claim 14, wherein the subsystem includes a remote keyless entry system, a remote start system or an infotainment system.

16. The system of claim 11, wherein the automobile module is a standalone device.

17. The system of claim 11, wherein the transceivers in the automobile bridge and the automobile module are WiFi, Bluetooth, or Zigbee transceivers.

18. The system of claim 11, wherein the automobile bridge is configured to provide the sensor data to the home network and, in response to the sensor data, the home network is configured to trigger an event in the home.

19. The system of claim 11, wherein the automobile bridge is configured to provide an instruction to the vehicle module based on an action inside the home.

20. A system for home and automobile connectivity, comprising:

a module, the module configured to be connected to a plurality of sensors and a plurality of wired communication paths in a vehicle, the module configured to output sensor data via a plurality of wireless communication paths; and an interpreter, the interpreter including a plurality of different communication protocols for communicating with different ecosystems in a home network, and a plurality of transceivers for communication with the home network and the module, wherein the different communication protocols permit communication with a plurality of different smart home assistants, and wherein the interpreter is further configured to translate a message sent from the vehicle to a communication protocol of the smart home assistant to which it is destined, wherein in response to an action at the vehicle, a user-programmed routine stored in the module is executed such that a command is sent from the module to the home network via the interpreter thereby causing the home network to activate a pre-determined sequence of events in the home, wherein the module includes a plurality of transceivers for communicating with the interpreter and the home network, a user interface for permitting a user to set up routines to be performed when the vehicle arrives at/departs from the home, and an assist input to connect the module to at least one of the smart home assistants.

* * * * *